United States Patent
Earl et al.

(10) Patent No.: US 11,585,133 B2
(45) Date of Patent: Feb. 21, 2023

(54) HINGE DEVICE

(71) Applicant: Ningbo Geely Automobile Research & Development Co., Ltd., Ningbo (CN)

(72) Inventors: Tony Earl, Witney (GB); Mohammad Thenoon, Gothenburg (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 464 days.

(21) Appl. No.: 16/724,236

(22) Filed: Dec. 21, 2019

(65) Prior Publication Data

US 2020/0123821 A1   Apr. 23, 2020

Related U.S. Application Data (63) Continuation of application No. PCT/CN2018/089803, filed on Jun. 4, 2018.

(30) Foreign Application Priority Data

Jul. 3, 2017 (EP) .................................... 17179294

(51) Int. Cl.
*E05D 3/02* (2006.01)
*B60J 5/10* (2006.01)
*E05D 5/02* (2006.01)

(52) U.S. Cl.
CPC ................ *E05D 3/02* (2013.01); *B60J 5/102* (2013.01); *E05D 5/0207* (2013.01);
(Continued)

(58) Field of Classification Search
CPC ... E05D 3/02; E05D 5/0207; E05D 2005/067; E05Y 2201/602; E05Y 2201/638; E05Y 2201/71; E05Y 2900/548; B60J 5/102
See application file for complete search history.

(56) References Cited

U.S. PATENT DOCUMENTS 2,073,119 A * 3/1937 Phiel ......................... E05D 3/02
  16/379
2,132,266 A * 10/1938 Lefevre ................... E05D 3/022
  16/361

(Continued)

FOREIGN PATENT DOCUMENTS

| CN | 102016211 A | 4/2011 |
|---|---|---|
| CN | 203879169 U | 10/2014 |

(Continued)

OTHER PUBLICATIONS

International Search Report and Written Opinion from corresponding International Patent Application No. PCT/CN2018/089803, dated Aug. 16, 2018, 10 pages.

(Continued)

*Primary Examiner* — Victor D Batson
*Assistant Examiner* — Matthew J Sullivan
(74) *Attorney, Agent, or Firm* — Tucker Ellis LLP (57) ABSTRACT

A hinge device for a vehicle, wherein the hinge device includes a first member, which has two spaced brackets, a second member, which is arranged between the brackets. The hinge device further includes a hinge arrangement defining a hinge axis and adapted to connect the second member to the brackets so that the members may turn in relation to each other about the hinge axis. The hinge device is adapted for allowing movement of the hinge axis via movement of the hinge arrangement.

15 Claims, 7 Drawing Sheets

(52) U.S. Cl.
CPC ... *E05Y 2201/602* (2013.01); *E05Y 2201/638* (2013.01); *E05Y 2900/548* (2013.01)

(56) References Cited

U.S. PATENT DOCUMENTS

| | | | | |
|---|---|---|---|---|
| 2,959,808 | A * | 11/1960 | Limberg | E05D 3/022 16/354 |
| 3,065,498 | A * | 11/1962 | Johnson | E05D 3/18 16/359 |
| 5,584,099 | A * | 12/1996 | Westerdale | E05D 7/0423 296/76 |
| 5,611,114 | A * | 3/1997 | Wood, Jr. | E05D 3/127 16/371 |
| 6,976,290 | B2 * | 12/2005 | Boyer | E05D 11/1042 16/334 |
| 9,677,308 | B1 * | 6/2017 | Chen | E05D 3/06 |
| 9,823,706 | B2 * | 11/2017 | Chen | E05D 3/02 |
| 10,001,815 | B1 * | 6/2018 | Yao | H05K 5/0234 |
| 10,028,398 | B1 * | 7/2018 | Lin | F16M 13/00 |
| 10,168,746 | B2 * | 1/2019 | Senatori | G06F 1/1616 |
| 11,255,116 | B2 * | 2/2022 | Zhang | E05D 15/505 |
| 2017/0152690 | A1 * | 6/2017 | Knoechel | E05D 5/06 |
| 2018/0373296 | A1 * | 12/2018 | Wendt | E05D 3/122 |
| 2020/0050000 | A1 * | 2/2020 | Yoshida | E05D 3/02 |
| 2020/0102025 | A1 * | 4/2020 | Kwon | E05D 11/1057 |
| 2020/0165849 | A1 * | 5/2020 | Olkay | E05D 3/02 |
| 2020/0284078 | A1 * | 9/2020 | Prim | E05D 3/02 |
| 2021/0089091 | A1 * | 3/2021 | Ravenscroft | H04M 1/0216 |
| 2022/0049534 | A1 * | 2/2022 | Wittelsburger | F16F 9/5126 |
| 2022/0065010 | A1 * | 3/2022 | Huang | B65D 43/167 |

FOREIGN PATENT DOCUMENTS

| | | |
|---|---|---|
| CN | 104797167 A | 7/2015 |
| CN | 104912417 A | 9/2015 |
| CN | 204899530 U | 12/2015 |
| CN | 206000325 U | 3/2017 |
| CN | 106761081 A | 5/2017 |
| DE | 4112635 A1 | 10/1992 |
| EP | 2035640 A1 | 3/2009 |
| EP | 2481873 A1 | 8/2012 |
| JP | 3697952 B2 | 9/2005 |

OTHER PUBLICATIONS

Extended European Search Report from corresponding European Patent Application No. 17179294.8, dated Dec. 1, 2018, 7 pages.
International Preliminary Report on Patentability from corresponding International Patent Application No. PCT/CN2018/089803, dated Oct. 10, 2018, 7 pages.

* cited by examiner

HINGE DEVICE

RELATED APPLICATION DATA

This application is a continuation of International Patent Application No. PCT/CN2018/089803, filed Jun. 4, 2018, which claims the benefit of European Patent Application No. 17179294.8, filed Jul. 3, 2017, the disclosures of which are incorporated herein by reference in their entireties.

TECHNICAL FIELD

The technical field generally relates to automotive engineering and particularly relates to a hinge device for a vehicle, such as a passenger car. The car comprises different openings covered by swingable panels, such as a tailgate and doors, for providing access to the car interior. Such swingable panels may be attached to the car body via the hinge device.

BACKGROUND

Tailgates installed in motor vehicles are typically coupled to the car body by means of two tailgate hinges spaced in a transverse direction of the vehicle and mounted on an upper edge of the tailgate. The tailgate hinge may be realized in many different ways, such as technically simple constructions, in which pins are accommodated in sleeves.

SUMMARY

An objective of the invention is to provide a hinge device, which, when applied to a vehicle, creates conditions for an improved geometry at an interface of a swingable panel.

The objective is achieved by a hinge device for a vehicle, wherein the hinge device comprises a first member, which comprises two spaced brackets, a second member, which is arranged between the brackets, and a hinge arrangement defining a hinge axis and adapted to connect the second member to the brackets so that the members may turn in relation to each other about the hinge axis, characterized in that the hinge device is adapted for allowing movement of the hinge axis via movement of the hinge arrangement. The hinge device may be adapted for allowing movement of the hinge arrangement between a first position and a second position.

The hinge device creates conditions for improved solutions in complex geometry set-ups. Further, the solution creates conditions for achieving a joint between the swingable panel and an adjacent part of a vehicle body, with a reduced gap in a closed state. This is turn, creates conditions for a reduced air resistance during driving, which in turn may lead to an improved fuel economy. Further, the solution creates conditions for an aesthetically attractive design of a joint between two members, such as a car body and a tailgate.

According to one embodiment, the hinge device is adapted for allowing movement of the hinge arrangement in a direction along a straight line perpendicular to the hinge axis direction. This design creates conditions for achieving the movement of the hinge arrangement in a robust and cost-effective way.

According to a further embodiment, the hinge device is adapted for allowing movement of the hinge arrangement simultaneously with a turning of the members relative to one another. The hinge axis may be moved in a continuous manner between a first position and a second position simultaneously with a continuous movement of the first and second members relative to one another between a first position and a second position. By properly designing and dimensioning the hinge device in relation to the vehicle parts defining the gap, such as the car body and the tailgate, movement of the moveable part passed the exterior of the adjacent part may be achieved while achieving a small gap in the closed state.

According to a further embodiment, one of the first member and the second member comprises a first elongated guide slot for receiving the hinge arrangement for the movement of the hinge arrangement. This design creates conditions for a robust design in a cost-effective way. Further, the elongated guide slot may have an extension in a plane perpendicular to the hinge axis. Further, the first elongated guide slot may be adapted for receiving the hinge arrangement in a sliding manner.

According to a further development of the last-mentioned embodiment, the other one of the first member and the second member comprises an opening for receipt of a part of the hinge arrangement so that this member may turn in relation to the hinge arrangement about the hinge axis and move together with the hinge arrangement in the first elongated guide slot. The opening may have a circular cylindrical shape and be elongated. The opening may be formed by a through-hole. Further, the opening may be provided with a bushing/sleeve for receipt of the hinge arrangement. Further, the part of the hinge arrangement received in the opening may have a circular cylindrical shape and dimension matching the design of the opening.

According to a further development of the last-mentioned embodiment, each one of the brackets of the first member comprises the first elongated guide slot, wherein the first elongated guide slots are arranged in parallel with each other for receiving opposite ends of the hinge arrangement for the movement of the hinge arrangement. This design creates conditions for a robust construction. According to one example, the first elongated guide slots are arranged for receiving opposite ends of the hinge arrangement in a sliding manner.

According to a further development of the last-mentioned embodiment, contact surfaces of the hinge arrangement and at least one of the brackets are adapted for allowing movement of the hinge arrangement in a way that the hinge arrangement is in a fixed position in relation to a turning direction around the hinge axis during the movement of the hinge arrangement. This design creates conditions for a robust construction, wherein the movement of the hinge axis is achieved via the hinge arrangement moving along the first elongated guide slot and the turning of the members is achieved via the interacting parts of the hinge arrangement and the second member.

According to a further development of the last-mentioned embodiment, the hinge arrangement comprises a non-rotationally symmetrical part forming a first one of the contact surfaces in a direction perpendicular to the hinge axis and one of the brackets comprises a support surface for contacting the non-rotationally symmetrical part of the hinge arrangement. The support surface may have an extension in parallel with the defined movement direction of the hinge arrangement, which may be defined by an extension of the elongated guide slot, for continuously supporting the hinge arrangement during the movement in the guide slot. Further, the non-rotationally symmetrical part may be formed by a washer. Further, the non-rotationally symmetrical part may be in contact with an external side of the bracket in a hinge axis direction and non-rotationally connected to a cylindrical part of the hinge arrangement positioned between the brackets.

According to a further embodiment, the hinge arrangement comprises at least one tensioner for tensioning the hinge arrangement to the brackets in a hinge axis direction. There may be two tensioners, such as screws, acting on opposite sides of the brackets. This design creates conditions for achieving equally large forces acting on the brackets from opposite sides in the direction of the hinge axis, wherein a friction between the hinge arrangement and the brackets during operation may be the same on both sides.

According to a further embodiment, the hinge device comprises a guide structure for guiding the members in relation to each other during the movement of the hinge arrangement. In this way, a controlled and continuous movement of the hinge arrangement may be secured as the vehicle parts are turned relative to one another.

According to a further development of the last-mentioned embodiment, the guide structure is adapted for guiding the members in relation to each other along an arcuate path during the movement of the hinge arrangement. The hinge device may be designed so that the arcuate path has such an extension that the adjacent vehicle parts moving relative to one another follows a desired path avoiding any contact during the movement while still achieving a tight fit in the closed state.

According to a further development of the last-mentioned embodiment, the guide structure comprises a second elongated guide slot, which has a different extension direction than the first elongated guide slot, and a pin for being slidably received in the second elongated guide slot. This design creates conditions for a robust construction. According to one example, the guide structure is formed in that each one of the brackets of the first member comprises the second elongated guide slot for receiving opposite ends of the pin. According to a further example, the second member comprises a further elongated opening for receipt of the pin. The second member may be arranged so that the openings extend in a spaced relationship in parallel with each other.

According to a first alternative, the guide structure comprises a first toothed structure on a cylindrical surface of the hinge arrangement and a second toothed structure on a surface extending in parallel with the first elongated guide slot in the brackets, wherein the first and second toothed structures are adapted for engagement with each other. According to this alternative, the hinge arrangement may be rotationally rigidly connected to the second member so that the second member turns around the hinge axis as the hinge arrangement moves along the slot with the toothed structures in engagement.

According to a second alternative, the guide structure comprises a projection on one of the first member and the second member, which projection is provided with a contact surface adapted for contacting an adjacent surface of the other one of the first member and the second member. According to one example, the guide structure comprises a projection on the second member being provided with a contact surface adapted for contacting an adjacent surface of the first member. Further, the adjacent contact surface may extend in a direction different from the movement direction of the hinge axis. Further, the hinge arrangement may be spring-biased in one direction along the guide slot. This alternative creates conditions for that the projection will interact with the adjacent contact surface during a relative movement between the vehicle parts, wherein the hinge arrangement will be either pushed or pulled along the guide slot.

According to a further embodiment, one of the first hinge member and the second hinge member is adapted to be secured to a car body and the other one of the first and second hinge parts is adapted to be secured to a swingable panel, such as a door or tailgate.

According to a further aspect, the invention regards a vehicle, characterized in that it comprises a hinge device according to any one of the above-mentioned embodiments, examples and further developments, wherein the hinge device is arranged for movement of a swingable panel, such as a door or tailgate, relative to a car body between an open position and a closed position.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
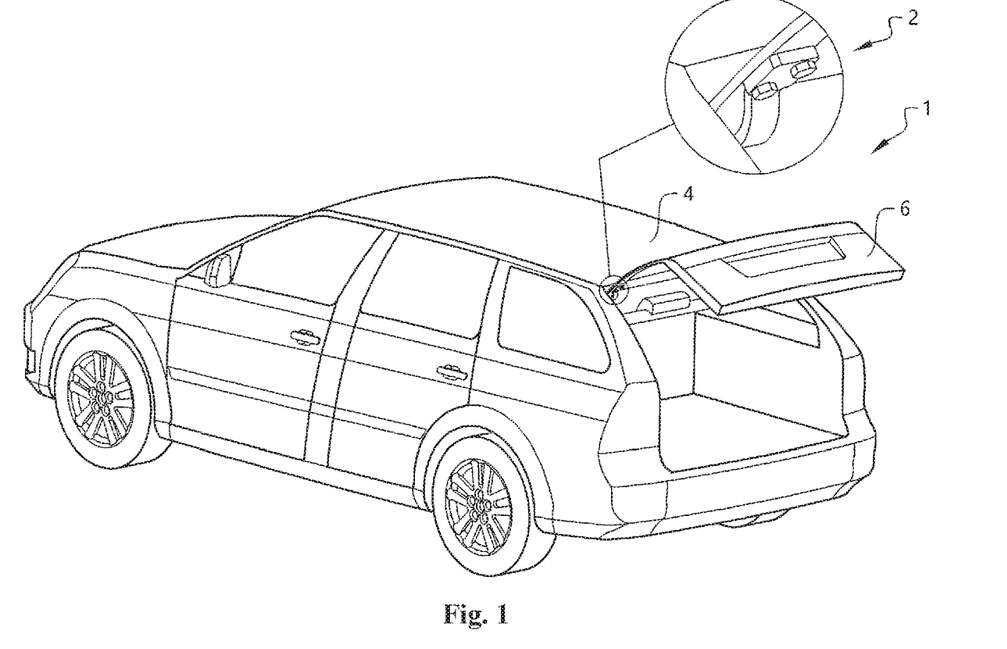
FIG. 1 is a perspective view of a vehicle in the form of a passenger car, which comprises a hinge device according to a first example embodiment arranged for opening and closing, respectively, a tailgate.
Figure 2:
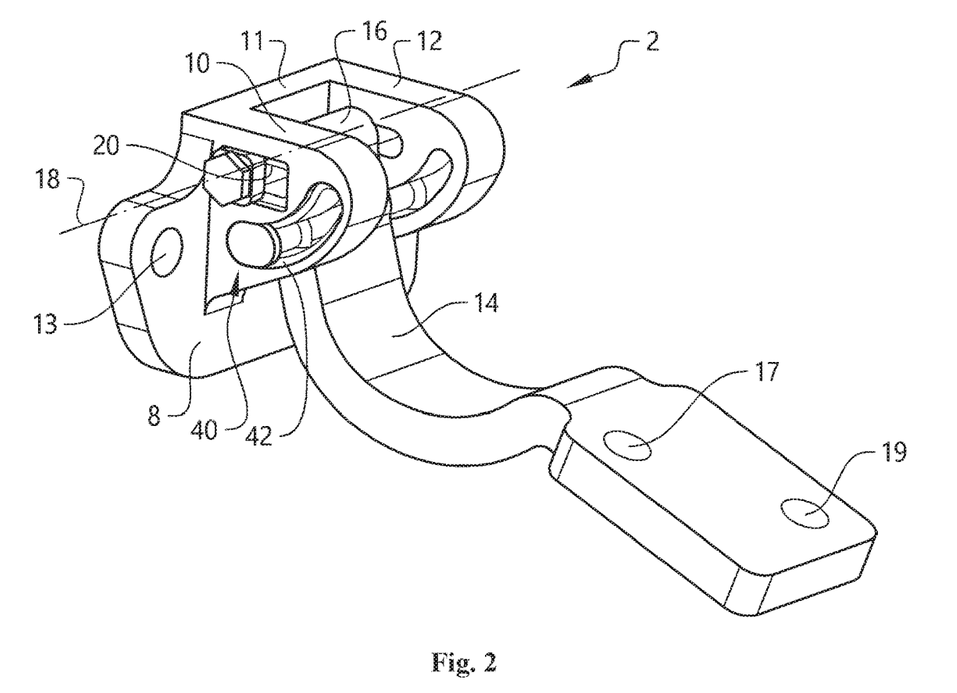
FIGS. 2 and 3 are perspective views of the hinge device according to the first example embodiment, wherein the hinge device is in a closed state and an open state, respectively.
Figure 3:
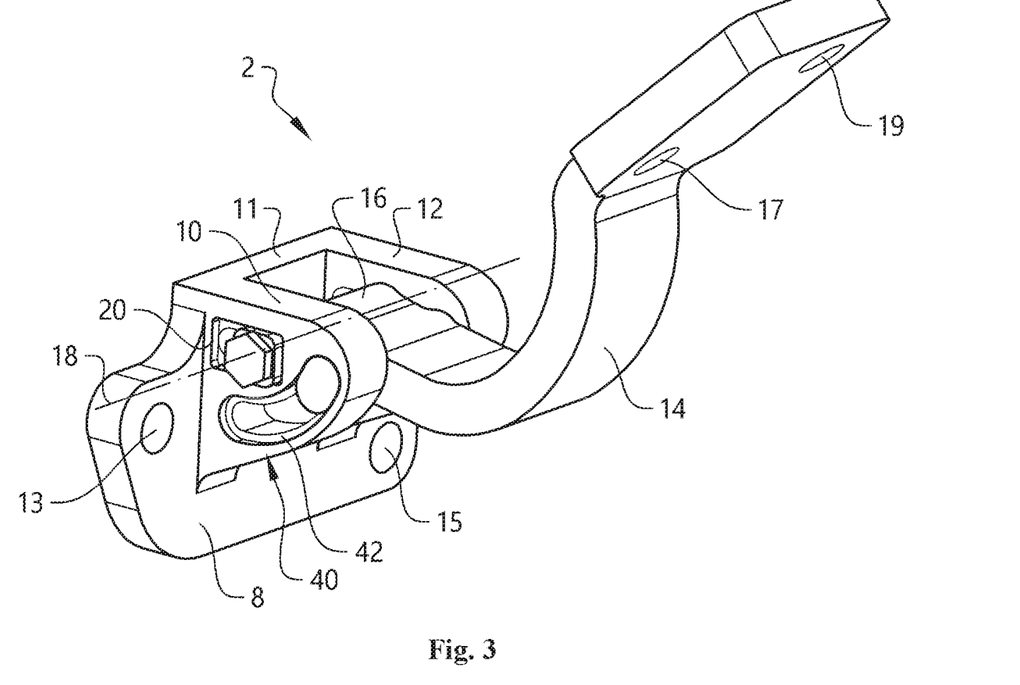
Figure 4:
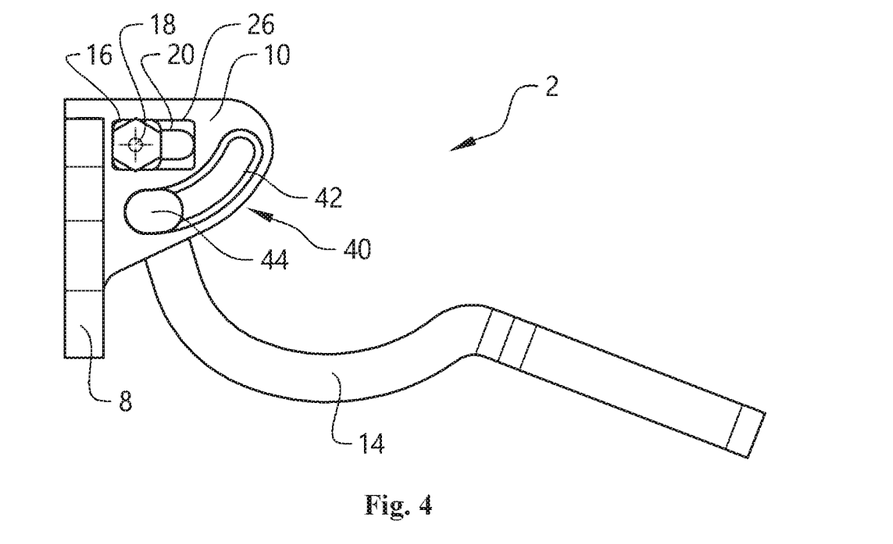
FIGS. 4 and 5 are side views of the hinge device according to the first example embodiment, wherein the hinge device is in a closed state and an open state, respectively.
Figure 5:
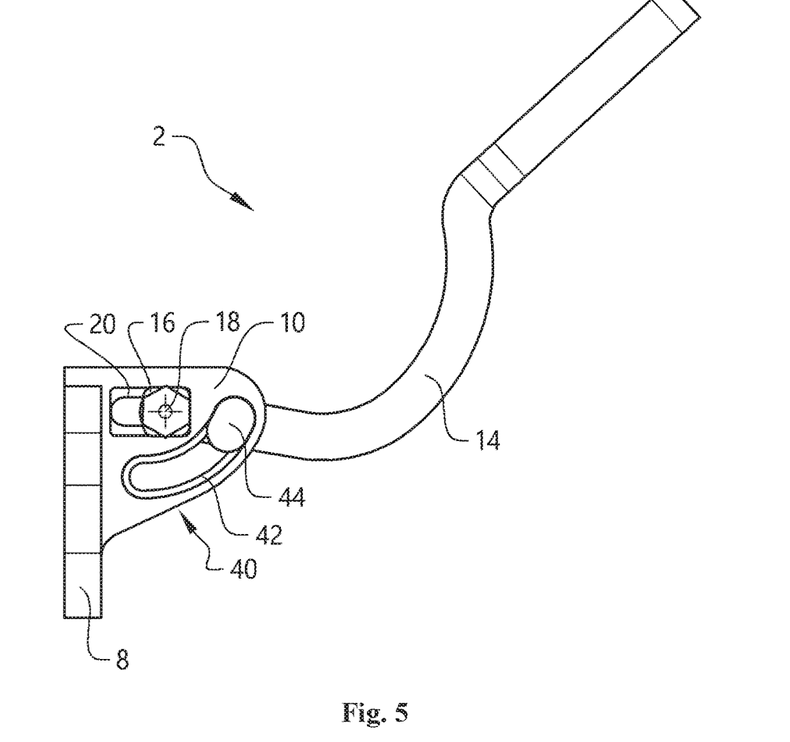
Figure 6:
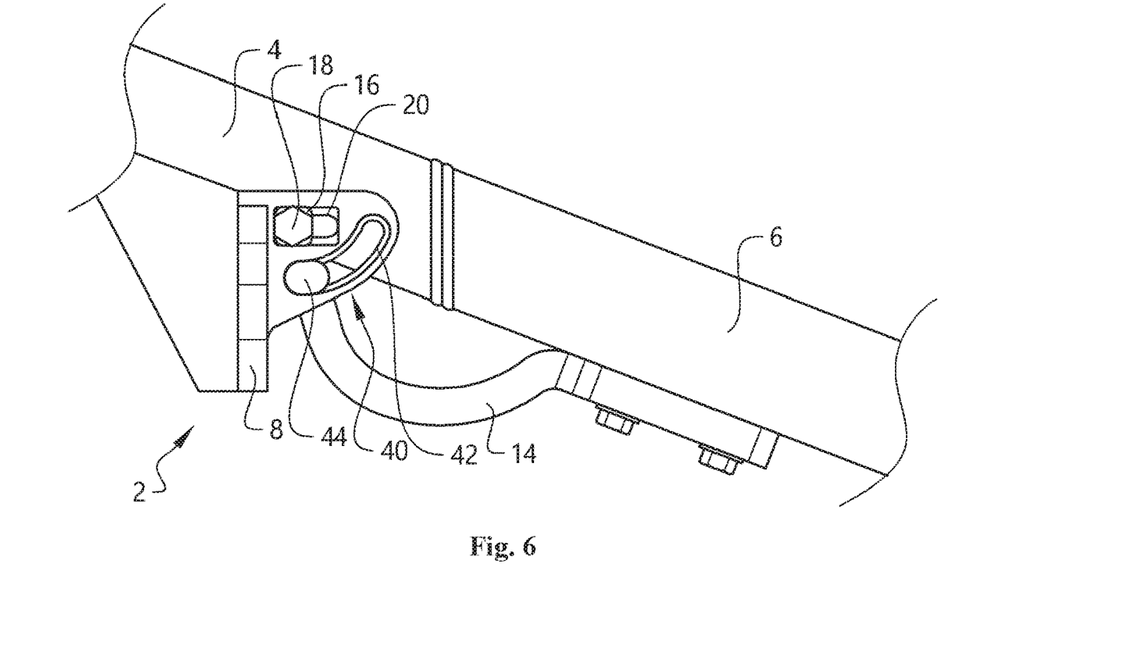
FIGS. 6 and 7 are side views of the hinge device according to the first example embodiment in the vehicle tailgate application in FIG. 1, wherein the hinge device is in a closed state and an open state, respectively.
Figure 7:
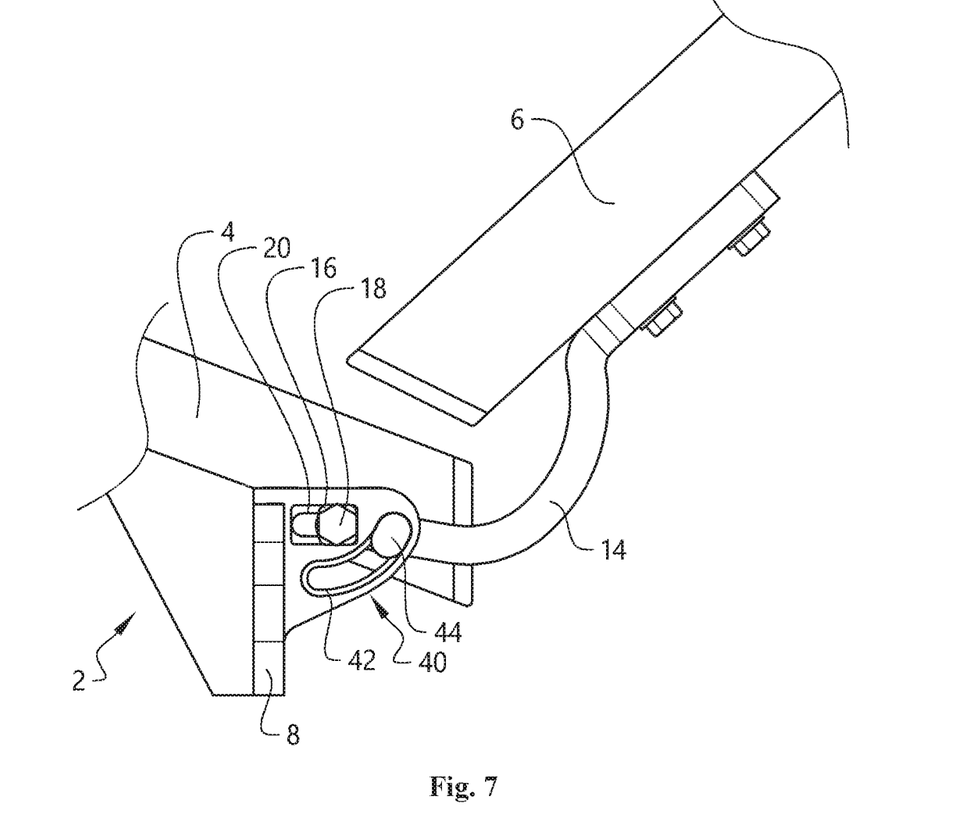

FIG. 1 is a perspective view of a vehicle 1 in the form of a passenger car, which comprises a hinge device 2 according to a first example embodiment. The hinge device 2 is arranged for opening and closing, respectively, a tailgate 6 relative to a car body 4 of the car 1.

Turning now to FIG. 2-5. The hinge device 2 comprises a first hinge member 8 for being rigidly mounted to the car body 4. The first member 8 comprises two spaced brackets 10, 12. Each one of the brackets 10, 12 is plate shaped and extends in parallel with a plane. Further, the two brackets extend in parallel with each other. Further, the first member 8 comprises a base section 11, which is connected to the brackets 10, 12 in a way that the brackets project from the base section. The base section 11 is also plate shaped and extends in parallel with a plane. The brackets 10, 12 extend substantially perpendicular to the base section 11. More specifically, the base section 11 and the brackets 10, 12 are formed in a one-piece unit. The base section comprises holes 13, 15 for receipt of fasteners, such as screws or rivets, for rigidly mounting the first member 8 to the car body 4.

The hinge device 2 further comprises a second hinge member 14, in the form of a swinging arm, for being rigidly mounted to the tailgate 6. The second member 14 is arranged between the brackets 10, 12. The second member 14 comprises holes 17, 19 for receipt of fasteners, such as screws or rivets, for rigidly mounting the second member 14 to the tailgate. Further, the second member 14 is plate shaped, wherein an extension plane of the second member is at least substantially perpendicular in relation to the extension of brackets 10, 12.

The hinge device 2 further comprises a hinge arrangement 16 defining a hinge axis 18 and adapted to connect the second member 14 to the brackets 10, 12 so that the members may turn in relation to each other about the hinge axis. In other words, the relative turning of the members define an angular relative movement. The hinge device 2 is adapted for allowing movement of the hinge axis 18 via movement of the hinge arrangement 16. More specifically, the hinge device 2 is adapted for allowing movement of the hinge arrangement 16 between a first position, such as an end stop in one direction, and a second end position, such as an end stop in the other direction. The first position corresponds to the tailgate being arranged in a closed position and the second position corresponds to the tailgate being arranged in a fully open position. Further, the hinge device 2 is adapted for allowing parallel movement of the hinge arrangement 16.

Further, the hinge device 2 is adapted for allowing movement of the hinge arrangement 16 in a direction along a straight line perpendicular to the hinge axis direction. Further, the hinge device 2 is adapted for allowing movement of the hinge arrangement 16 in a way that the hinge arrangement is in a fixed position in relation to a turning direction around the hinge axis during the movement of the hinge arrangement.

Further, the hinge device 2 is adapted for allowing movement of the hinge arrangement 16 simultaneously with a turning of the members 8, 14 relative to one another. More specifically, the hinge axis 18 is moved in a continuous manner from the first position to the second position simultaneously with a continuous movement of the first member relative to the second member from a first end position to a second end position.

Figure 10:
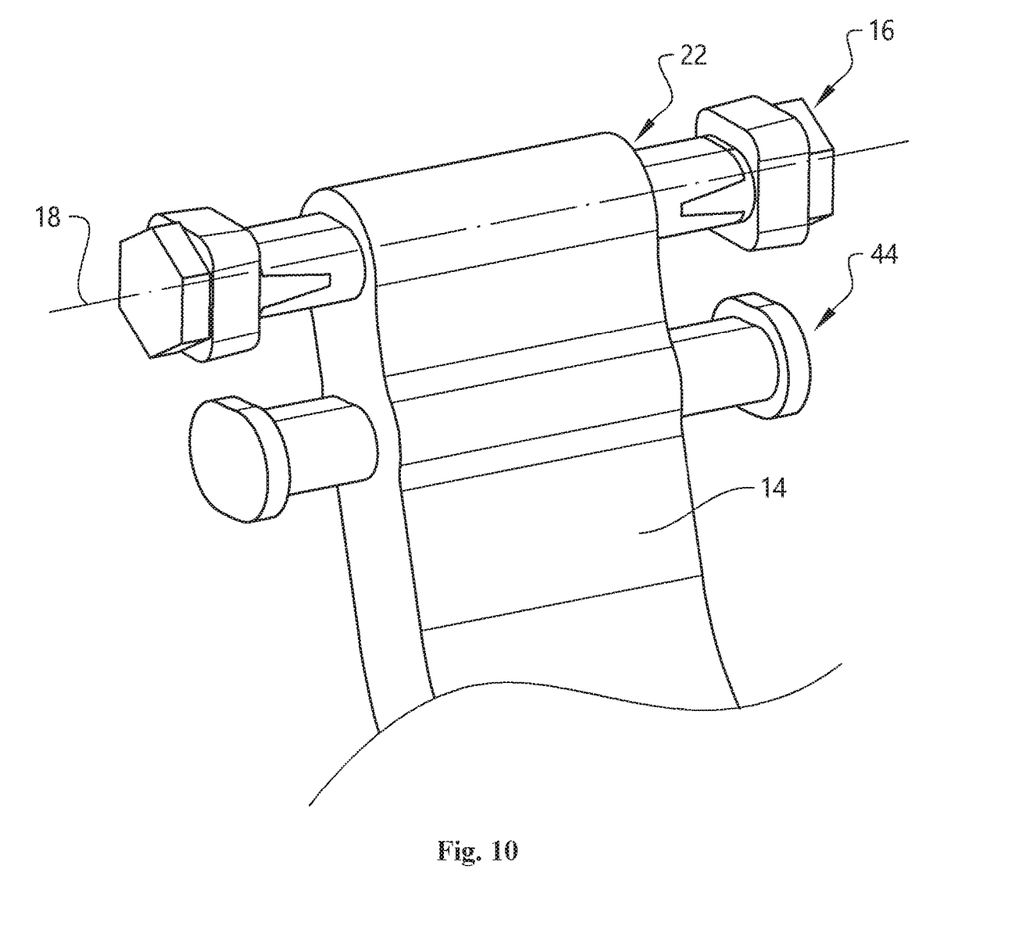
FIG. 10 is a perspective view of a portion of a hinge member provided with the hinge arrangement of the hinge device according to the first example embodiment.

The second member 14 comprises an opening 22, see FIG. 10, for receipt of a part of the hinge arrangement 16 so that the second member 14 may turn in relation to the hinge arrangement about the hinge axis 18 and move together with the hinge arrangement in the first elongated guide slot 20. The opening has a circular cylindrical shape and is elongated. The opening 22 is here formed by a through-hole and it may be provided with a sleeve or bushing around the hinge arrangement.

The first member 8 comprises a first elongated guide slot 20 for receiving the hinge arrangement 16 in a sliding manner for the movement of the hinge arrangement. More specifically, each one of the brackets 10, 12 of the first member 8 comprises the first elongated guide slot 20. The first elongated guide slots are arranged in parallel with each other for receiving opposite ends of the hinge arrangement 16 in a sliding manner for the movement of the hinge arrangement.

Figure 8:
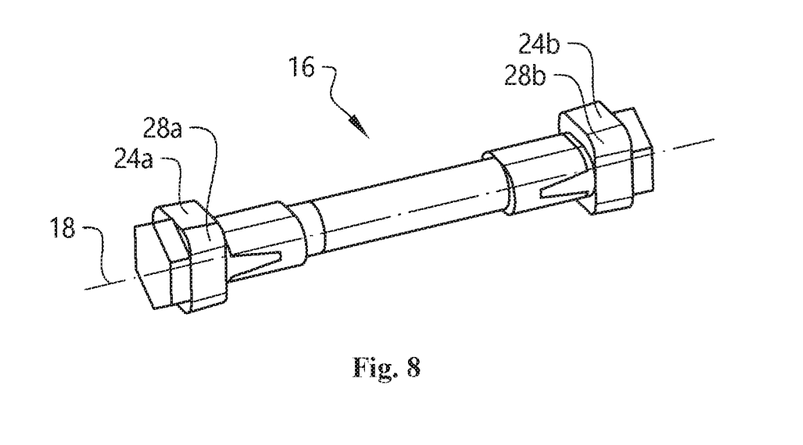
FIG. 8 is a perspective view of a hinge arrangement forming a part of the hinge device according to the first example embodiment.
Figure 9:
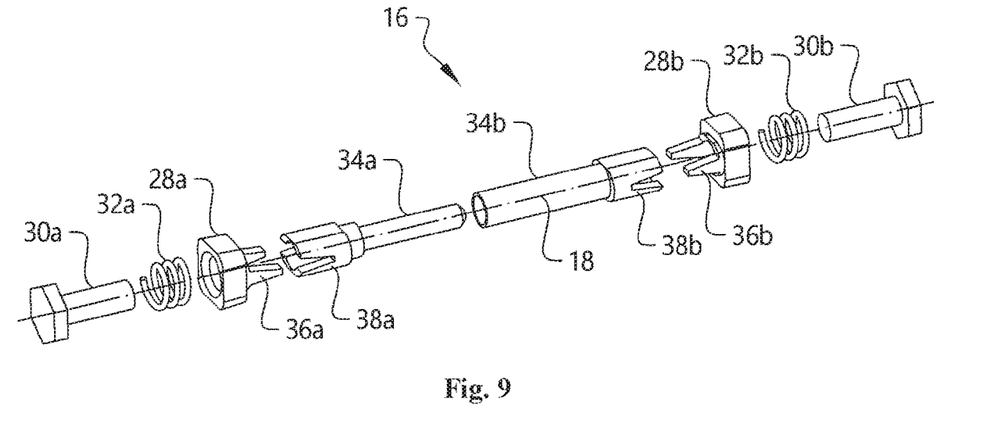
FIG. 9 is an exploded view of a hinge arrangement according to FIG. 8.

Turning now also to FIG. 8-9. Contact surfaces 24a, 24b; 26 of the hinge arrangement 16 and the brackets 10 are adapted for allowing movement of the hinge arrangement in a way that the hinge arrangement is in a fixed position in relation to a turning direction around the hinge axis 18 during the movement of the hinge arrangement. More specifically, the hinge arrangement 16 comprises a non-rotationally symmetrical part 28a, 28b forming a first one of the contact surfaces 24a, 24b in a direction perpendicular to the hinge axis 18 and one of the brackets 10 comprises a support surface 28 for contacting the non-rotationally symmetrical part of the hinge arrangement. The non-rotationally symmetrical part forms a washer with a straight side edge forming the contact surface. Further, the support surface 28 of the bracket is arranged adjacent the first elongated guide slot 20 and in parallel with the guide slot. Further, the washer is arranged on an external side of the associated bracket.

The hinge arrangement 16 further comprises two tensioners 30a, 30b for tensioning the hinge arrangement to the brackets 10, 12 from opposite sides in a hinge axis direction. The tensioners 30a, 30b are here formed by screws, which is each biased via a spring 32a, 32b, arranged outside each one of the brackets. The springs 32a, 32b act in different directions along the hinge axis 18. This design creates conditions for achieving equally large forces acting on the brackets from opposite sides in the direction of the hinge axis, wherein a friction between the hinge arrangement and the brackets during operation may be the same on both sides.

The hinge arrangement 16 further comprises a circular cylindrical part 34b arranged between the brackets 10, 12 adapted to be positioned in the through hole 22 of the second member 14. The cylindrical part 34b is formed by a sleeve, which is rotationally rigidly connected to a first one of the washers 28b via engagement means 36b, 38b. Further, the hinge arrangement 16 comprises a further circular cylindrical part 34a, which is rotationally rigidly connected to a second one of the washers 28a via engagement means 36a, 38a and positioned inside of the sleeve 34b. In this way, the hinge arrangement is mountable from opposite sides in the hinge axis direction. Further, due to this design, no part of the hinge arrangement will turn during turning of the members 8, 14 relative to one another around the hinge axis 18.

The hinge device 2 further comprises a guide structure 40 for guiding the members 8, 14 in relation to each other during the movement of the hinge arrangement. The guide structure 40 is adapted for guiding the members in relation to each other along an arcuate path during the movement of the hinge arrangement. The guide structure 40 comprises a second elongated guide slot 42 in the brackets 8, 10, which has a different extension direction than the first elongated guide slot 20. The second elongated guide slots are arranged in parallel with each other for receiving opposite ends of a pin 44 in a sliding manner for the movement of the hinge arrangement. The second elongated guide slot 42 has an arcuate shape and more specifically a part-circular shape. The second member 14 comprises a further opening 46 in the form of a through hole for receipt of the pin 44. The openings 22, 46 in the second member 14 are spaced from each other and arranged in a parallel relationship so that an extension direction of the pin 44 is in parallel with the hinge axis 18. Thus, the hinge arrangement 16 and the pin 46 can simultaneously slide in their respective guide slots 20, 42 against friction force.

Figure 11:
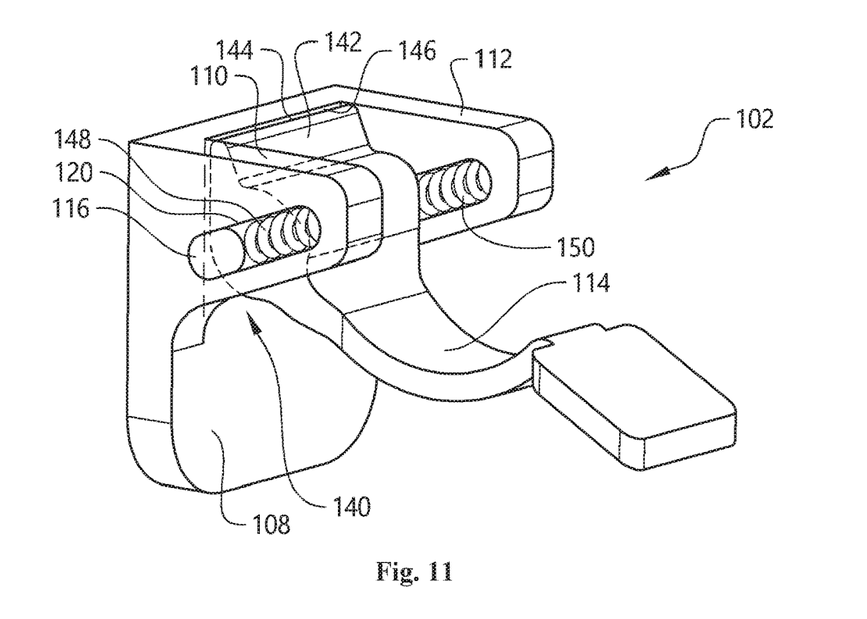
FIGS. 11 and 12 are perspective views of the hinge device according to a second example embodiment, wherein the hinge device is in a closed state and an open state, respectively.
Figure 12:
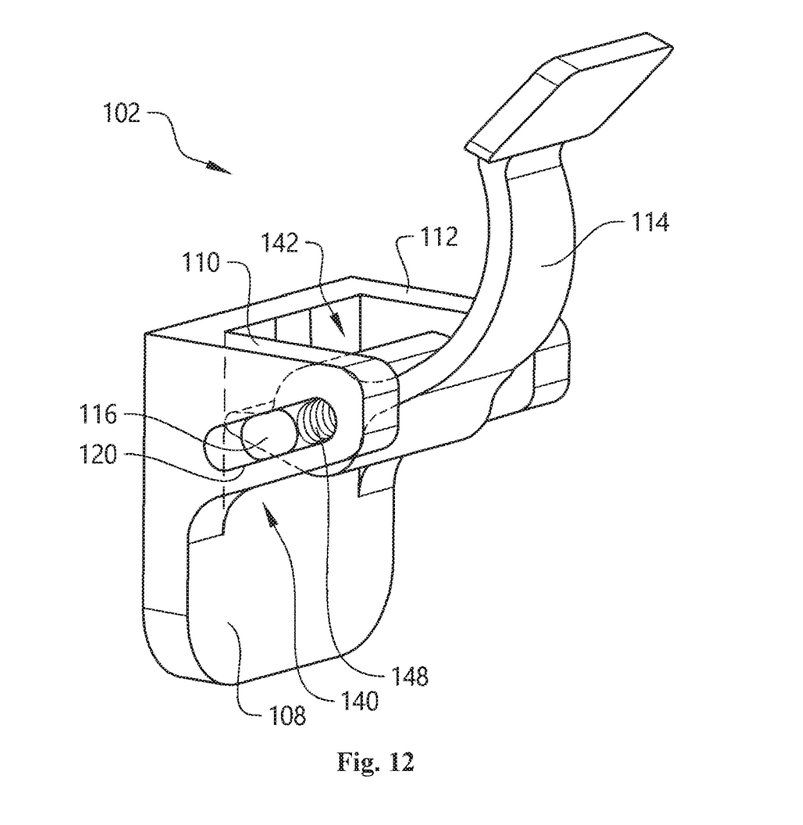

FIGS. 11 and 12 are perspective views of the hinge device 102 according to a second example embodiment, wherein the hinge device 102 is in a closed state and an open state, respectively. In a similar manner as has been described above, the hinge device 102 comprises a first member 108, which comprises two spaced brackets 110, 112, a second member 114, which is arranged between the brackets, and a hinge arrangement 116 defining a hinge axis and adapted to connect the second member to the brackets so that the members may turn in relation to each other about the hinge axis. The hinge device 102 is also adapted for allowing movement of the hinge axis via movement of the hinge arrangement 116. For ease of presentation, only the main differences in relation to the first example embodiment is described.

The hinge device 102 comprises a guide structure 140, which comprises a projection 142 on the second member 114, which projection is provided with a contact surface 144 adapted for contacting an adjacent surface 146 of the first member 108. The projection 142 extends in a different direction than the remainder of the second member in relation to the opening for the hinge arrangement. More specifically, the projection extends substantially in an opposite direction than the remainder of the second member in relation to the opening for the hinge arrangement. Further, the adjacent contact surface 146 extends in a direction different from the movement direction of the hinge axis so that the hinge arrangement will be moved along the guide slot due to the contact between the projection and the adjacent surface. More specifically, the adjacent contact surface 146 forms a part of the base section between the brackets. Further, the adjacent contact surface 146 is planar. Further, the projection 142 has a tapering cross section shape from a base portion at the opening for the hinge arrangement to a free end (tip). Further, the projection 142 has a rounded external shape at the tip. Further, the projection 142 is formed in a one-piece unit with the second member 114. Further, the guide structure 140 comprises at least one spring 148, 150 for biasing the second member to an end position in the hinge axis movement direction. More specifically, one spring 148, 150 is arranged at each side of the second member and in parallel with the first elongated guide slot 120 and acting on opposite ends of the hinge arrangement. When the tailgate is moved between the end positions, the projection 142 will be in engagement with the adjacent contact surface of the first member 108 and the hinge arrangement 116 will accordingly travel along the guide slot.

Figure 13:
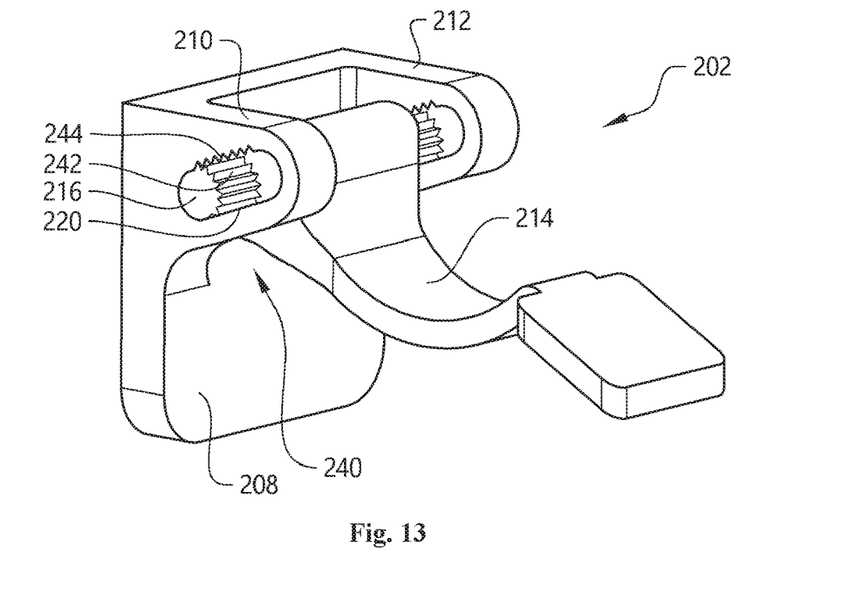
FIGS. 13 and 14 are perspective views of the hinge device according to a third example embodiment, wherein the hinge device is in a closed state and an open state, respectively.
Figure 14:
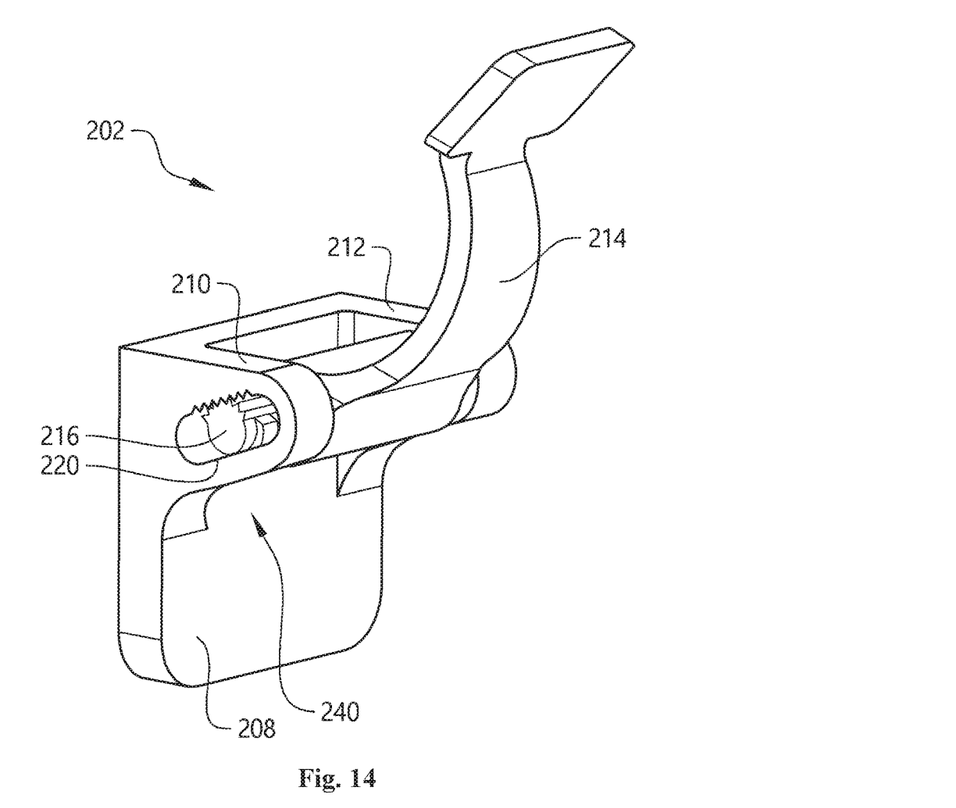

FIGS. 13 and 14 are perspective views of the hinge device 202 according to a second example embodiment, wherein the hinge device 202 is in a closed state and an open state, respectively. In a similar manner as has been described above, the hinge device 202 comprises a first member 208, which comprises two spaced brackets 210, 212, a second member 214, which is arranged between the brackets, and a hinge arrangement 216 defining a hinge axis and adapted to connect the second member to the brackets so that the members may turn in relation to each other about the hinge axis. The hinge device 202 is also adapted for allowing movement of the hinge axis via movement of the hinge arrangement 216. For ease of presentation, only the main differences in relation to the first example embodiment is described below.

The hinge device 202 comprises a guide structure 240, which comprises a first toothed structure 242 on a cylindrical surface of the hinge arrangement and a second toothed structure 244 on a surface extending in parallel with the first elongated guide slot 220 in the brackets, wherein the first and second toothed structures 242, 244 are adapted for engagement with each other. Further, the hinge arrangement 216 is rotationally rigidly connected to the second member 214. When the tailgate is moved between the end positions, the toothed structures 242, 244 will be in engagement and the hinge arrangement 216 will accordingly travel along the guide slot.

The hinge arrangement may be rotationally rigidly connected to the second member so that the second member turns around the hinge axis as the hinge arrangement moves along the slot.

It is to be understood that the present invention is not limited to the embodiments described above and illustrated in the drawings; rather, the skilled person will recognize that many changes and modifications may be made within the scope of the appended claims.

What is claimed is:

1. A hinge device for a vehicle, wherein the hinge device comprises a first member, which comprises two spaced brackets, a second member, which is arranged between the two spaced brackets, and a hinge arrangement defining a hinge axis and adapted to connect the second member to the two spaced brackets so that the first and second members turn in relation to each other about the hinge axis,
   wherein each one of the two spaced brackets of the first member comprises a first elongated guide slot for receiving the hinge arrangement for movement of the hinge arrangement relative to the two spaced brackets, the movement of the hinge arrangement effecting movement of the hinge axis, the first elongated guide slots being arranged in parallel with each other for receiving opposite ends of the hinge arrangement for the movement of the hinge arrangement,
   wherein the second member comprises an opening for receipt of a part of the hinge arrangement so that the second member turns in relation to the hinge arrangement about the hinge axis and moves together with the hinge arrangement in the first elongated guide slots,
   wherein the hinge device is adapted for allowing movement of the hinge arrangement in a direction along a straight line perpendicular to the hinge axis direction,
   wherein the hinge arrangement comprises first contact surfaces and at least one of the two spaced brackets comprises a second contact surface and wherein one of the contact surfaces of the hinge arrangement and the contact surface of the at least one of the two spaced brackets contact one another to prevent rotational movement of the hinge arrangement during movement of the hinge arrangement in the direction along the straight line, and
   wherein the hinge device comprises a guide structure comprising a second elongated guide slot for guiding the first and second members in relation to each other during the movement of the hinge arrangement, and a pin slidably received in the second elongated guide slot.

2. A hinge device according to claim 1, wherein the hinge device is adapted for allowing movement of the hinge arrangement simultaneously with a turning of the first and second members relative to one another.

3. A hinge device according to claim 1, wherein the hinge arrangement comprises a part forming the one of the contact surfaces in a direction perpendicular to the hinge axis.

4. A hinge device according to claim 1, wherein the hinge arrangement comprises at least one tensioner for tensioning the hinge arrangement to the brackets in a hinge axis direction.

5. A hinge device according to claim 1, wherein the guide structure is adapted for guiding the members in relation to each other along an arcuate path during the movement of the hinge arrangement.

6. A hinge device according to claim 1, wherein the guide structure is formed in that each one of the two spaced brackets of the first member comprises the second elongated guide slot for receiving opposite ends of the pin.

7. A hinge device according to claim 1, wherein one of the first hinge member and the second hinge member is adapted to be secured to a car body and the other one of the first and second hinge members is adapted to be secured to a swingable panel.

8. A vehicle comprising a hinge device according to claim 1, and wherein the hinge device is arranged for movement of a swingable panel relative to a car body between an open position and a closed position.

9. A hinge device according to claim 1, wherein the hinge axis is configured to be moved in a continuous manner between a first position and a second position simultaneously with a continuous movement of the first and second members relative to one another between a first position and a second position.

10. A hinge device according to claim 1, wherein each of the two spaced brackets comprises the second elongated guide slot.

11. A hinge device according to claim 10, wherein each second elongated guide slot is arcuate in shape.

12. A hinge device for a vehicle, the hinge device comprising:
a first member having two spaced brackets each comprising a first elongated guide slot arranged in parallel with each other, a second elongated guide slot, and a first contact surface, the second elongated guide slot being arcuate in shape; a second member arranged between the two spaced brackets, the second member having a first opening and a second opening; a hinge arrangement defining a hinge axis and comprising second contact surfaces, the hinge arrangement connecting the second member to the two spaced brackets such that the first and second members turn in relation to each other about the hinge axis, the hinge arrangement extending through the first opening in the second member and having opposed ends received in the first elongated guide slots for movement of the hinge arrangement relative to the two spaced brackets, the movement of the hinge arrangement effecting movement of the hinge axis; and
a pin extending through the second opening in the second member and slidably received in the second elongated guide slot of each of the two spaced brackets,
wherein the second member turns in relation to the hinge arrangement about the hinge axis and moves together with the hinge arrangement in a direction along a straight line perpendicular to the hinge axis direction in the first elongated guide slots, and
wherein one of the first contact surfaces of the hinge arrangement and the second contact surface of one of the two spaced brackets contact one another preventing rotational movement of the hinge arrangement during movement of the hinge arrangement in the direction along the straight line.

13. A hinge device according to claim 12, wherein the hinge arrangement comprises a part forming the one of the contact surfaces in a direction perpendicular to the hinge axis.

14. A hinge device according to claim 12, wherein the hinge arrangement comprises at least one tensioner for tensioning the hinge arrangement to the brackets in a hinge axis direction.

15. A hinge device according to claim 12, wherein one of the first hinge member and the second hinge member is adapted to be secured to a car body and the other one of the first and second hinge members is adapted to be secured to a swingable panel.

* * * * *